United States Patent
Mannebach et al.

(10) Patent No.: US 9,090,761 B2
(45) Date of Patent: Jul. 28, 2015

(54) POLYETHYLENE FOR INJECTION MOLDINGS

(75) Inventors: Gerd Mannebach, Münstermaifeld (DE); Harald Schmitz, Weinheim (DE); Shahram Mihan, Bad Soden (DE); Rainer Karer, Kaiserlautern (DE); Manfred Hecker, Neustadt (DE); Guido Funk, Worms (DE); Adrian Popa, Gozée (BE)

(73) Assignee: Basell Polyolefine GmbH, Wesseling (DE)

( * ) Notice: Subject to any disclaimer, the term of this patent is extended or adjusted under 35 U.S.C. 154(b) by 672 days.

(21) Appl. No.: 13/060,076

(22) PCT Filed: Aug. 27, 2009

(86) PCT No.: PCT/EP2009/006210
§ 371 (c)(1),
(2), (4) Date: May 18, 2011

(87) PCT Pub. No.: WO2010/022941
PCT Pub. Date: Mar. 4, 2010

(65) Prior Publication Data
US 2011/0217499 A1  Sep. 8, 2011

(30) Foreign Application Priority Data

Aug. 29, 2008 (EP) .................................. 08015245

(51) Int. Cl.
*C08F 110/02* (2006.01)
*C08F 110/14* (2006.01)
*C08F 110/06* (2006.01)
*C08L 23/04* (2006.01)

(52) U.S. Cl.
CPC ............. *C08L 23/04* (2013.01); *C08L 2205/02* (2013.01); *Y10T 428/139* (2015.01)

(58) Field of Classification Search
USPC ........... 428/36.9; 526/352, 348, 348.2, 348.3, 526/348.4, 348.6
See application file for complete search history.

(56) References Cited

U.S. PATENT DOCUMENTS 3,125,547 A   3/1964   Blatz

FOREIGN PATENT DOCUMENTS

| EP | 0129368 | 12/1984 | |
| EP | 0 492 656 A1 * | 12/1991 | ............. C08L 23/04 |
| EP | 0492656 A1 | 7/1992 | |
| EP | 0545304 | 6/1993 | |
| EP | 0561479 | 9/1993 | |
| EP | 0576970 | 1/1994 | |
| EP | 0632063 | 1/1995 | |
| EP | 0661300 | 7/1995 | |
| EP | 0416815 | 8/1997 | |
| EP | 0659758 | 11/1998 | |
| EP | 1655338 A1 | 5/2006 | |
| EP | 2017302 A1 | 1/2009 | |
| WO | 9303093 | 2/1993 | |
| WO | 9827124 | 6/1998 | |
| WO | 0031090 | 6/2000 | |
| WO | 2005103095 | 11/2005 | |
| WO | 2005103096 | 11/2005 | |
| WO | 2007003530 | 1/2007 | |

OTHER PUBLICATIONS

Randall, James; "A Review of High Resolution Liquid (13) Carbon Nuclear Magnetic Resonance Characterizations of Ethylene-Based Polymers"; JMS-Rev. Macomol. Chem. Phys., C29(2&3), 201-317 (1989); pp. 201-317.

Holtrup, Wolfgang "Zur Fraktionierung von Polymeren durch Diektextraktion", Makromol. Chem., 1977, vol. 178, p. 2335-2349.

Wild, Leslie; "Temperature Rising Elution Fractionation"; Advances in Polymer Science 98, 1990, vol. 98, pp. 1-47.

Pang, Simon and Rudin, Alfred; "Size-Exclusion Chromotographic Assessment of Long-Chain Branch Frequency in Polethylenes"; ACS Series 521, 1993, Chromatography of Polymers, Ed. Theodore Provder pp. 254-269.

Wiesenfeldt, Helga et al; "ansa-Metallocene Derivatives"; Journal of Organometallic Chemistry, 1989, vol. 369, pp. 359-370, Netherlands.

Small, Brooke et al., "Highly Active Iron and Cobalt Catalysts for the Polymerization of Ethylene", J. Am. Chem. Soc., 1998, vol. 120, p. 4049-4050.

Britovsek, George, "Novel Olefin Polymerization Catalysts based on Iron and Cobalt"; J. Chem. Soc., Chem. Commun. ;1998, pp. 849-850.

Burkhardt, U. et al.; Aufbereiten von Polymeren mit neuartigen Eigenschaften, VDI-Verlag, Düsseldorf, 1995, p. 71.

Benoit, Rempp, Grubisic; "A Universal Calibration for Gel Permeation Chromatography", J. Polymer Sci., Phys. Ed. 5, 1967, pp. 753-759.

* cited by examiner

*Primary Examiner* — Robert Harlan

(57) ABSTRACT

A polyethylene for IM having excellent processing properties in terms of spiral flow testing is devised.

10 Claims, No Drawings

POLYETHYLENE FOR INJECTION MOLDINGS

This application is the U.S. national phase of International Application PCT/EP2009/006210, filed Aug. 27, 2009, claiming priority to European Application 08015245.7 filed Aug. 29, 2008; the disclosures of International Application PCT/EP2009/006210 and European Application 08015245.7, each as filed, are incorporated herein by reference.

DESCRIPTION

The present invention relates to a novel polyethylene composition for injection moulding and finished parts made thereof.

In recent times, polyethylene blends have been used in injection molding (IM) to produce many types of screw closures, for instance. It is advantageous if the screw closures retain their dimension and shape during cooling after the injection molding procedure, i.e. do not shrink (low shrinkage). Accurate, tight fit further asks for utmost uniformity of the moulding process itself. The polyethylene molding compositions must have good flowability in the melt without risk of melt fracture. Flowability allows to better control uniform wall thickness of finished parts formed. Good processability is also paramount to achieving high through-put of process. Still then, any improvement in processing behaviour may not imbalance the mechanical properties such as stress crack resistance, which must match ever increasing standards.

WO 05/103096 describes polyethylene polymer composition for IM which combine good processing behaviour, in terms of spiral flow, with good but not superior stress crack resistance, determined as FNCT=7.4 at 3.5 Mpa/80° C. However, further improvement of processing quality along with maintaining or enhancing stress crack resistance remains to be achieved.

It is an object of the present invention to avoid the disadvantages of the prior art and to devise a new polyethylen having enhanced processability, preferably whilst maintaining good or even further enhancing stress crack resistance.

This object is surprisingly solved by the polyethylene composition of the present invention. A polyethylene which comprises ethylene homopolymers and/or copolymers of ethylene with 1-alkenes and has a molecular weight distribution $M_w/M_n > 10$, a density of from 0.92 to 0.98 g/cm$^3$, a melt flow rate MI (2.16 kg/190° C.) according to ISO 1133:2005 of >0.5 g/10 min, preferably of from 1-10 g/10 min and most preferably of from 1.5 to 3.5 g/10 min, and a spiral length of >520 mm in spiral flow testing further defined below (and again in the experimental section as condition A).

Preferably, the polyethylene has a density of from 0.935 to 0.97 g/cm$^3$, preferably of from 0.945 to 0.965 g/cm$^3$, and particularly preferably in the range from 0.948 to 0.955 g/cm$^3$ Preferably, the spiral length obtained from spiral flow test is >200 mm, preferably is of from 200 mm up to 350 mm, more preferably is of from 205 up to 250 mm (@testing condition: 1050 bar, 1 mm, 190° C.). Detail description of the testing conditions can be found in the experimental section.

Preferably, the polyethylene has an at least bimodal short chain branching distribution (SCB), preferably, it is bimodal as regards short chain branching distribution and hence comonomer distribution. Bimodality requires the presence of two, eventually overlapping but distinguishable, peaks in TREF analysis, whilst a product that is monomodal with regard to SCB would display one peak only.

The polyethylene of the invention preferably has a molar mass distribution width $M_w/M_n$ of from 10 to 20, particularly preferably from 11-15.

Preferably, the weight average molar mass $M_w$ of the polyethylene of the invention is in the range from 50 000 g/mol to 200 000 g/mol, preferably from 70 000 g/mol to 150 000 g/mol and particularly preferably from 80 000 g/mol to 120 000 g/mol. The HLMI of the polyethylene of the invention is preferably in the range from 1 to 300 g/10 min, preferably from 50 to 200 g/10 min. For the purposes of this invention, the expression "HLMI" refers as known to the "high load melt index" and is determined at 190° C. under a load of 21.6 kg (190° C./21.6 kg) in accordance with ISO 1133. The same applies to melt flow MI determined at lower loads of 2.16 kg and 5 kg, respectively. Preferably, the polyethylene of the invention has a MI (@2.16 kg/190° C.) of from 0.5 to 20 dg/min, preferably of from 1.2 to 6 dg/min.

The density [g/cm$^3$] was determined according to ISO 1183. The determination of the molar mass distributions and the means Mn, Mw, and Mw/Mn derived therefrom was carried out by means of high-temperature gel permeation chromatography as described in the experimental section.

The polyethylene of the invention has from 0.1 to 15 branches/1000 carbon atoms, preferably from 0.2 to 8 branches/1000 carbon atoms and particularly preferably from 0.3 to 3 branches/1000 carbon atoms. The branches/1000 carbon atoms are determined by means of $^{13}$C-NMR, as described by James. C. Randall, JMS-REV. Macromol. Chem. Phys., C29 (2&3), 201-317 (1989), and refer to the total content of CH$_3$ groups/1000 carbon atoms.

Furthermore, the 1 to 15% by weight of the polyethylene having the highest molar masses, preferably 2 to 12% by weight and particularly preferable 3 to 8% by weight, have a degree of branching of more than 1 branch of side chains larger than CH$_3$/1000 carbon atoms, preferably in the range from 2 to 20 branches of side chains larger than CH$_3$/1000 carbon atoms and particularly preferably in the range from 5 to 15 branches of side chains larger than CH$_3$/1000 carbon atoms. This can be determined by sovent-nonsolvent fractionation, later called Holtrup fractionation as described in W. Holtrup, Makromol. Chem. 178, 2335 (1977) coupled with IR measurement of the different fractions. Xylene and ethylene glycol diethyl ether at 130° C. were used as solvents for the fractionation. 5 g of polyethylene were used and were divided into 8 fractions. The fractions are subsequently examined by $^{13}$C-NMR spectroscopy. The degree of branching in the various polymer fractions can be determined by means of $^{13}$C-NMR as described by James. C. Randall, JMS-REV. Macromol. Chem. Phys., C29 (2&3), 201-317 (1989). The polyethylene of the invention preferably has a CDBI of less than 50%, in particular from 10 to 45%. The method of determining the CDBI is described, for example in WO 93/03093. The TREF method is described, for example, in Wild, Advances in Polymer Science, 98, p. 1-47, 57 p. 153, 1992. The CDBI is defined as the percentage by weight of the copolymer molecules having a co-monomer content of ±25% of the mean total molar comonomer content. Branches of side chains larger than CH$_3$ refers to the content of side chains/1000 carbon atoms without end groups.

The molar mass distribution of the polyethylene of the invention can be monomodal, bimodal or multimodal. In the present patent application, a monomodal molar mass distribution means that the molar mass distribution has a single maximum. A bimodal molar mass distribution means, for the purposes of the present patent application, that the molar mass distribution has at least two points of inflection on one flank starting from a maximum. The molar mass distribution is preferably monomodal or bimodal, in particular bimodal.

The 1 to 15% by weight of the polyethylene of the invention having the highest molar masses, preferably the 2 to 12% by weight and particularly preferably the 3 to 8% by weight as fractionated by gel permeation chromatography (GPC) and analyzed by "temperature rising elution fractionation technique" (TREF), preferably do not show a high density polyethylene peak with a maximum above 80° C., preferably above 85° C. and particularly preferable above 90° C. The concentration of polymer in the fractions obtained at various temperatures is measured by means of infrared spectroscopy. The TREF result can also be calibrated by means of preparatively isolated polyethylene fractions having a defined number of short chain branches. The TREF method is described, for example, in Wild, Advances in Polymer Science, 98, p. 1-47, 57 p. 153, 1992.

When the polyethylene of the invention is examined by TREF, the fractions at a maximum above 80° C., preferably above 85° C. and particularly preferable above 90° C., when examined by GPC preferably show only polyethylene with molar masses below 1 million g/mol as opposed to polyethylenes obtained with the usual Ziegler catalysts.

The polyethylene of the invention preferably has a degree of long chain branching λ (lambda) of from 0 to 2 long chain branches/10 000 carbon atoms and particularly preferably from 0.1 to 1.5 long chain branches/10 000 carbon atoms. The degree of long chain branching λ (lambda) was measured by light scattering as described, for example, in ACS Series 521, 1993, Chromatography of Polymers, Ed. Theodore Provder; Simon Pang and Alfred Rudin: Size-Exclusion Chromatographic Assessment of Long-Chain Branch Frequency in Polyethylenes, page 254-269.

Preferably the 5-50% by weight of the polyethylene of the invention having the lowest molar masses, preferably 10-40% by weight and particularly preferably 15-30% by weight, have a degree of branching of less than 10 branches/1000 carbon atoms. This degree of branching in the part of the polyethylene having the lowest molar masses is preferably from 0.01 to 9 branches/1000 carbon atoms and particularly preferably from 0.1 to 6 branches/1000 carbon atoms. This can be determined by means of the Holtrup/$^{13}$C-NMR method described. The branches/1000 carbon atoms are determined by means of $^{13}$C-NMR, as described by James. C. Randall, JMS-REV. Macromol. Chem. Phys., C29 (2&3), 201-317 (1989), and refer to the total content of $CH_3$ groups/1000 carbon atoms The polyethylene of the invention has at least 0.2 vinyl groups/1000 carbon atoms, preferably from 0.7 to 5 vinyl groups/1000 carbon atoms and particularly preferably from 0.9 to 3 vinyl groups/1000 carbon atoms. The content of vinyl groups/1000 carbon atoms is determined by means of IR, ASTM D 6248-98. For the present purposes, the expression vinyl groups refer to —CH=$CH_2$ groups; vinylidene groups and internal olefinic groups are not encompassed by this expression. Vinyl groups are usually attributed to a polymer termination reaction after an ethylene insertion, while vinylidene end groups are usually formed after a polymer termination reaction after a comonomer insertion.

The polyethylene of the invention preferably has from 0.01 to 20 branches of side chains larger than $CH_3$/1000 carbon atoms, preferably side chains from $C_2$-$C_6$/1000 carbon atoms, preferably from 1 to 15 branches of side chains larger than $CH_3$/1000 carbon atoms, preferably side chains from $C_2$-$C_6$/1000 carbon atoms and particularly preferably from 2 to 8 branches of side chains larger than $CH_3$/1000 carbon atoms, prefereably side chains from $C_2$-$C_6$/1000 carbon atoms. The branches of side chains larger than $CH_3$/1000 carbon atoms are determined by means of $^{13}$C-NMR, as determined by James. C. Randall, JMS-REV. Macromol. Chem. Phys., C29 (2&3), 201-317 (1989), and refer to the total content of side chains larger than $CH_3$ groups/1000 carbon atoms (without end groups). It is particularly preferred in polyethylene with 1-butene, 1-hexene or 1-octene as the α-olefin to have 0.01 to 20 ethyl, butyl or hexyl side branches/1000 carbon atoms, preferably from 1 to 15 ethyl, butyl or hexyl side branches/1000 carbon atoms and particularly preferably from 2 to 8 ethyl, butyl or hexyl side branches/1000 carbon atoms. This refers to the content of ethyl, butyl or hexyl side chains/1000 carbon atoms without the end groups.

In the polyethylene of the invention, the part of the polyethylene having a molar mass of less than 10 000 g/mol, preferably less than 20 000, preferably has a degree of branching of from 0 to 1.5 branches of side chains larger than $CH_3$/1000 carbon atoms, preferably of side chains of from $C_2$-$C_6$/1000 carbon atoms. Particular preference is given to the part of the polyethylene having a molar mass of less than 10 000 g/mol, preferably less than 20 000, having a degree of branching of from 0.1 to 0.9 branches of side chains larger than $CH_3$/1000 carbon atoms, preferably side chains from $C_2$-$C_6$/1000 carbon atoms. Preferably the polyethylene of the invention with 1-butene, 1-hexene or 1-octene as the 1-alkene, the part of the polyethylene having a molar mass of less than 10 000 g/mol, preferably less than 20 000, preferably has a degree of from 0 to 1.5 ethyl, butyl or hexyl branches of side chains/1000 carbon atoms. Particular preference is given to the part of the polyethylene having a molar mass of less than 10 000 g/mol, preferably less than 20 000, having a degree of branching of from 0.1 to 0.9 ethyl, butyl or hexyl branches of side chains/1000 carbon atoms. This too, can be determined by means of the Holtrup/$^{13}$C-NMR method described.

Furthermore, it is preferred that at least 70% of the branches of side chains larger than $CH_3$ in the polyethylene of the invention are present in the 50% by weight of the polyethylene having the highest molar masses. This too can be determined by means of the Holtrup/$^{13}$C-NMR method described.

The polyethylene of the invention preferably has a mixing quality measured in accordance with ISO 13949 of less than 3, in particular from 0 to 2.5. This value is based on the polyethylene taken directly from the reactor, i.e. the polyethylene powder without prior melting in an extruder. This polyethylene powder is preferably obtainable by polymerization in a single reactor.

As 1-alkenes, which are the comonomers which can be present in the ethylene copolymers of the present invention, either individually or as a mixture of comonomers, it is possible to use all 1-alkenes having from 3 to 20 carbon atoms, e.g. propene, 1-butene, 1-pentene, 1-hexene, 4-methyl-1-pentene, 1-heptene, 1-octene and 1-decene. The ethylene copolymer preferably comprises 1-alkenes having from 4 to 12 carbon atoms, e.g. 1-butene, 1-pentene, 1-hexene, 4-methylpentene or 1-octene, in copolymerized form as comonomer unit. Particular preference is given to using 1-alkenes selected from the group consisting of 1-butene, 1-hexene and 1-octene.

The polyethylene of the invention comprises preferentially 0.01 to 5% by weight, preferably 0.1 to 3% by weight of comonomer.

The polyethylene of the invention may further comprise of from 0 to 6% by weight, preferably of from 0.1 to 1% by weight of auxiliaries and/or additives known per se, e.g. processing stabilizers, stabilizers against the effects of light and heat, customary additives such as lubricants, antioxidants, antiblocking agents and antistatics, and also, if appropriate, dyes. A person skilled in the art will be familiar with the type and amount of these additives.

Furthermore, it has been found that the processing properties of the polyethylenes of the invention can be improved further by incorporation of small amounts of fluoroelastomers or thermoplastic polyesters. Such fluoroelastomers are known as such as processing aids and are commercially available, for example, under the trade names Viton® and Dynamar® (cf. also, for example, USA-3125547). They are preferably added in amounts of from 10 to 1000 ppm, particularly preferably from 20 to 200 ppm, based on the total mass of the polymer blend according to the invention.

In general mixing of the additives and the polyethylene of the invention can be carried out by all known methods. It can be done, for example, by introducing the powder components into a granulation apparatus, e.g. a twin-screw kneader (ZSK), Farrel kneader or Kobe kneader. The granulated mixture can also be processed directly on a film production plant.

We have also found the use of the polyethylenes of the invention for producing injection moldings, and injection moldings, preferably screw closures, caps, tube shoulders and engineering parts in which the polyethylene of the invention is present as a significant component.

Injection moldings, screw closures and caps, tube shoulders and engineering parts in which the polyethylene of the invention is present as a significant component are ones which contain from 50 to 100% by weight, preferably from 60 to 90% by weight, of the polyethylene of the invention, based on the total polymer material used for manufacture. In particular, injection moldings, screw closures and caps in which one of the layers contains from 50 to 100% by weight of the polyethylene of the invention are also included.

The polyethylene and the injection moldings of the invention with a thickness of 1 mm have preferably a haze, as determined according to ASTM D 1003-00 on a BYK Gardener Haze Guard Plus Device on at least 5 pieces of film 10×10 cm below 94%, preferably of from 10 to 92% and particularly prefarbly of from 50 to 91%.

The stress crack resistance (full notch creep test—FNCT)) of the polyethylene and injection mouldings as determined according to ISO 16770:2004 E at a pressure of 6 Mbar at 50° C. in a 2% by weight solution of Akropal N(N=10) in water, is preferably at least 30 h, more preferably at least 50 h and most preferably of from 60-80 h. This test definition includes test specimen preparation as a compressed plate as described in said ISO 16770:2004 E.

The polyethylene and the injection moldings of the invention with a given thickness of 1 mm have preferably an impact resistance as determined according to the instrumented falling weight impact test according to ISO 6603-2:2000 at −20° C. of at least 12 J.

The polyethylene can be processed on conventional injection molding machines. The finish on the moldings obtained is homogeneous and can be improved further by increasing the rate of injection or raising the mould temperature.

The flow properties under process conditions were determined with the spiral flow test. The polyethylene is injected at a defined temperature, pressure and screw speed into a spiral mould to obtain coils with various wall thicknesses. The length of the coil obtained can be regarded as a measure for the melt flow properties in a mould and hence the processability of the material, as is well accepted in the art. It is called spiral length, determined in mm. The polyethylene of the invention showed high flow properties, improving over the prior art, allowing of achieving spiral lengths of >520 mm, more preferably of >580 mm and most preferably of >600 mm, at a spiral flow testing condition of 1000 bar, 2 mm spiral wall thickness and an injection stock temperature of 250° C. Preferably, in conjunction therewith, screw speed was 90 mm/s, mould temperature was 30° C. and a Kraus-Maffei KM150-700C2 injection moulding machine was used for assessment. It is particularly preferred to have a polyethylene and injection moulding manufactured thereof having a spiral flow of >520 mm, more preferably of >580 mm and most preferably of >600 mm, under the afore said testing conditions which polyethylene further has, in conjunction therewith, an FNCT or stress crack resistance as defined above of at least 30 h, preferably of at least 50 h, and most preferably of at least 60 h, in particular of from 60-80 h.

Injection mouldings made from such polyethylene, preferably closures, caps and screw closures and caps, tube shoulders and engineering parts are ones which contain from 50 to 100% by weight, preferably from 60 to 90% by weight, of the polyethylene of the invention, based on the total polymer material used for manufacture. The screw caps and closures are preferably used for bottles, preferably bottles for beverages.

The polyethylene of the invention is obtainable using the catalyst system already set forth in WO 05/103096 along with its preferred embodiments and its mode of synthesis, fully incorporated herewith by reference.

The present invention further provides a catalyst composition comprising at least two different polymerization catalysts of which A) is at least one polymerization catalyst based on a monocyclopentadienyl complex of a metal of groups 4-6 of the Periodic Table of the Elements whose cyclopentadienyl system is substituted by an uncharged donor (A1) or which catalyst is a hafnocene (A2) and of which B) is at least one polymerization catalyst based on an iron component having a tridentate ligand bearing at least two ortho, ortho-disubstituted aryl radicals (B). For the purposes of the present invention, an uncharged donor is an uncharged functional group containing an element of group 15 or 16 of the Periodic Table. Hafnocene catalysts components are cyclopentadienyl complexes. The cyclopentadienyl complexes can be, for example, bridged or unbridged biscyclopentadienyl complexes as described, for example, in EP 129 368, EP 561 479, EP 545 304 and EP 576 970, or they are monocyclopentadienyl complexes such as bridged amidocyclopentadienyl complexes described, for example, in EP 416 815, multinuclear cyclopentadienyl complexes as described in EP 632 063, pi-ligand-substituted tetrahydropentalenes as described in EP 659 758 or pi-ligand-substituted tetrahydroindenes as described in EP 661 300.

The monocyclopentadienyl complexes (A1), which preferably are monocyclopentadienyl complexes titanium, zirconium, hafnium, vanadium, niobium, tantalum, chromium, molybdenum or tungsten, most preferably with chromium, have been structurally fully disclosed in WO 05/103096, which is incorporated herewith by reference. Similarly, their mode of synthesis has been disclosed.

Likewise, the structure, preferred types thereof and the mode of synthesis of the hafnocenes (A2) has been disclosed in WO 05/103096, incorporated herewith by reference. The catalyst system disclosed therein is the same as that of the present invention and may likewise, in full scope, be employed for synthesizing the polymer of the present invention. Particularly suitable hafnocenes (A2) are those of the formula (VII),

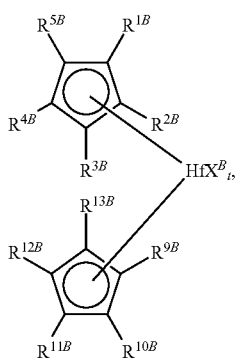

(VII)

more preferably with the cylopentadienyl moieties being identically substituted.

Among the compounds of the formula (VII), preference is given to those in which $X^B$ is fluorine, chlorine, bromine, $C_1$-$C_4$-alkyl or benzyl, or two radicals $X^B$ form a substituted or unsubstituted butadiene ligand, t is 1 or 2, preferably 2, $R^{1B}$ to $R^{5B}$ are each hydrogen, $C_1$-$C_8$-alkyl, $C_6$-$C_8$-aryl, $NR^{8B}{}_2$, $OSiR^{8B}{}_3$ or $Si(R^{8B})_3$ and $R^{9B}$ to $R^{13B}$ are each hydrogen, $C_1$-$C_8$-alkyl or $C_6$-$C_8$-aryl, $NR^{14B}{}_2$, $OSiR^{14B}{}_3$ or $Si(R^{14B})_3$ or in each case two radicals $R^{1B}$ to $R^{5B}$ and/or $R^{9B}$ to $R^{13B}$ together with the $C_5$ ring form an indenyl, fluorenyl or substituted indenyl or fluorenyl system, the radicals $R^{8B}$ can be identical or different and can each be $C_1$-$C_{10}$-alkyl, $C_3$-$C_{10}$-cycloalkyl, $C_6$-$C_{15}$-aryl, $C_1$-$C_4$-alkoxy or $C_6$-$C_{10}$-aryloxy the radicals $R^{14B}$ are identical or different and are each $C_1$-$C_{10}$-alkyl, $C_3$-$C_{10}$-cycloalkyl, $C_6$-$C_{15}$-aryl, $C_1$-$C_4$-alkoxy or $C_6$-$C_{10}$-aryloxy, Examples of particularly suitable Hafnocenes of the formula (VII) are, inter alia: bis(cyclopentadienyl)hafnium dichloride, bis(indenyl)hafnium dichloride, bis(fluorenyl)hafnium dichloride, bis(tetrahydroindenyl)hafnium dichloride, bis(pentamethylcyclopentadienyl)hafnium dichloride, bis(trimethylsilylcyclopentadienyl)hafnium dichloride, bis(trimethoxysilylcyclopentadienyl)hafnium dichloride, bis (ethylcyclopentadienyl)hafnium dichloride, bis (isobutylcyclopentadienyl)hafnium dichloride, bis(3-butenylcyclopentadienyl)hafnium dichloride, bis (methylcyclopentadienyl)hafnium dichloride, bis(1,3-di-tert-butylcyclopentadienyl)hafnium dichloride, bis (trifluoromethylcyclopentadienyl)hafnium dichloride, bis (tert-butylcyclopentadienyl)hafnium dichloride, bis(n-butylcyclopentadienyl)hafnium dichloride, bis (phenylcyclopentadienyl)hafnium dichloride, bis(N,N-dimethylaminomethylcyclopentadienyl)hafnium dichloride, bis(1,3-dimethylcyclopentadienyl)hafnium dichloride, bis (1-n-butyl-3-methylcyclopentadienyl)hafnium dichloride, (cyclopentadienyl)(methylcyclopentadienyl)hafnium dichloride, (cyclopentadienyl)(n-butylcyclopentadienyl) hafnium dichloride, (methylcyclopentadienyl)(n-butylcyclopentadienyl)hafnium dichloride, (cyclopentadienyl)(1-methyl-3-n-butylcyclopentadienyl)hafnium dichloride, bis (tetramethylcyclopentadienyl)hafnium dichloride and also the corresponding dimethylhafnium compounds. Further examples are the corresponding hafnocene compounds in which one or two of the chloride ligands have been replaced by bromide or iodide.

The synthesis of such complexes can be carried out by methods known per se, with the reaction of the appropriately substituted cyclic hydrocarbon anions with halides of hafnium being preferred. Examples of appropriate preparative methods are described, for example, in Journal of Organometallic Chemistry, 369 (1989), 359-370. The hafnocenes can be used in the Rac or pseudo-Rac form.

Strongly preferred iron catalysts B) are transition metal complexes with at least one, tridentate ligand of the general formulae

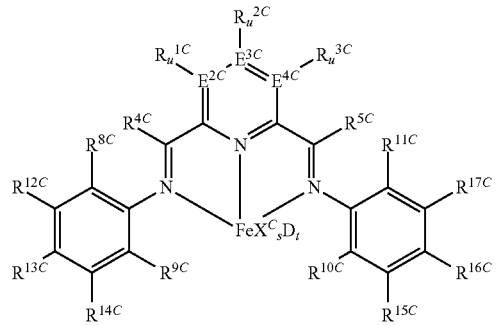

where $E^{2C}$-$E^{4C}$ are each, independently of one another, carbon or nitrogen, preferably carbon or nitrogen, more preferably with the proviso that maximally one or two atoms $E^{2C}$-$E^{4C}$ may be nitrogen, most preferably $E^{2C}$-$E^{4C}$ are carbon.

$R^{1C}$-$R^{3C}$ are each, independently of one another, hydrogen, $C_1$-$C_{22}$-alkyl, $C_2$-$C_{22}$-alkenyl, $C_6$-$C_{22}$-aryl, alkylaryl having from 1 to 10 carbon atoms in the alkyl part and 6-20 carbon atoms in the aryl part, halogen, $NR^{18C}{}_2$, $OR^{18C}$, $siR^{19}{}_3$, where the organic radicals $R^{1C}$-$R^{3C}$ may also be substituted by halogens and/or two vicinal radicals $R^{1C}$-$R^{3C}$ may also be joined to form a five-, six- or seven-membered ring, and/or two vicinal radicals $R^{1C}$-$R^{3C}$ are bound to form a five-, six- or seven-membered heterocycle containing at least one atom from the group consisting of N, P, O and S, $R^{4C}$-$R^{5C}$ are each, independently of one another, hydrogen, $C_1$-$C_{22}$-alkyl, $C_2$-$C_{22}$-alkenyl, $C_6$-$C_{22}$-aryl, alkylaryl having from 1 to 10 carbon atoms in the alkyl part and 6-20 carbon atoms in the aryl part, $NR^{18C}{}_2$, $SiR^{19C}{}_3$, where the organic radicals $R^{4C}$-$R^{5C}$ may also be substituted by halogens, u is 0 when $E^{2C}$-$E^{4C}$ is nitrogen and is 1 when $E^{2C}$-$E^{4C}$ is carbon, $R^{8C}$-$R^{11C}$ are each, independently of one another, $C_1$-$C_{22}$-alkyl, $C_2$-$C_{22}$-alkenyl, $C_6$-$C_{22}$-aryl, alkylaryl having from 1 to 10 carbon atoms in the alkyl part and 6-20 carbon atoms in the aryl part, halogen, $NR^{18C}{}_2$, $OR^{18C}$, $SiR^{19C}{}_3$, where the organic radicals $R^{8C}$-$R^{11C}$ may also be substituted by halogens and/or two vicinal radicals $R^{8C}$-$R^{17C}$ may also be joined to form a five-, six- or seven-membered ring, and/or two vicinal radicals $R^{8C}$-$R^{17C}$ are joined to form a five-, six- or seven-membered heterocycle containing at least one atom from the group consisting of N, P, O and S, $R^{12C}$-$R^{17C}$ are each, independently of one another, hydrogen, $C_1$-$C_{22}$-alkyl, $C_2$-$C_{22}$-alkenyl, $C_6$-$C_{22}$-aryl, alkylaryl having from 1 to 10 carbon atoms in the alkyl part and 6-20 carbon atoms in the aryl part, halogen, $NR^{18C}{}_2$, $OR^{18C}$, $SiR^{19C}{}_3$, where the organic radicals $R^{12C}$-$R^{17C}$ may also be substituted by halogens and/or two vicinal radicals $R^{8C}$-

$R^{17C}$ may also be joined to form a five-, six- or seven-membered ring, and/or two vicinal radicals $R^{8C}$—$R^{17C}$ are joined to form a five-, six- or seven-membered heterocycle containing at least one atom from the group consisting of N, P, O or S, the indices v are each, independently of one another, 0 or 1, the radicals $X^C$ are each, independently of one another, fluorine, chlorine, bromine, iodine, hydrogen, $C_1$-$C_{10}$-alkyl, $C_2$-$C_{10}$-alkenyl, $C_6$-$C_{20}$-aryl, alkylaryl having 1-10 carbon atoms in the alkyl part and 6-20 carbon atoms in the aryl part, $NR^{18C}_2$, $OR^{18C}$, $SR^{18C}$, $SO_3R^{18C}$, $OC(O)R^{18C}$, CN, SCN, β-diketonate, CO, $BF_4^-$, $PF_6^-$ or a bulky noncoordinating anion and the radicals $X^C$ may be joined to one another, the radicals $R^{18C}$ are each, independently of one another, hydrogen, $C_1$-$C_{20}$-alkyl, $C_2$-$C_{20}$-alkenyl, $C_6$-$C_{20}$-aryl, alkylaryl having from 1 to 10 carbon atoms in the alkyl part and 6-20 carbon atoms in the aryl part, $SiR^{19C}_3$, where the organic radicals $R^{18C}$ may also be substituted by halogens and nitrogen- and oxygen-containing groups and two radicals $R^{18C}$ may also be joined to form a five- or six-membered ring, the radicals $R^{19C}$ are each, independently of one another, hydrogen, $C_1$-$C_{20}$-alkyl, $C_2$-$C_{20}$-alkenyl, $C_6$-$C_{20}$-aryl, alkylaryl having from 1 to 10 carbon atoms in the alkyl part and 6-20 carbon atoms in the aryl part, where the organic radicals $R^{19C}$ may also be substituted by halogens or nitrogen- and oxygen-containing groups and two radicals $R^{19C}$ may also be joined to form a five- or six-membered ring, s is 1, 2, 3 or 4, in particular 2 or 3, depending on the oxidation state of the iron D is an uncharged donor and t is from 0 to 4, in particular 0, 1 or 2.

The number s of the ligands $X^C$ depends on the oxidation state of the iron. Preference is given to using iron complexes in the oxidation state +3 or +2.

D is an uncharged donor, in particular an uncharged Lewis base or Lewis acid, for example amines, alcohols, ethers, ketones, aldehydes, esters, sulfides or phosphines which may be bound to the iron center or else still be present as residual solvent from the preparation of the iron complexes.

The number t of the ligands D can be from 0 to 4 and is often dependent on the solvent in which the iron complex is prepared and the time for which the resulting complexes are dried and can therefore also be a nonintegral number such as 0.5 or 1.5. In particular, t is 0, 1 to 2.

The substituents $R^{4C}$-$R^{5C}$ can be varied within a wide range. Possible carboorganic substituents $R^{4C}$-$R^{5C}$ are, for example, the following: hydrogen, $C_1$-$C_{22}$-alkyl which may be linear or branched, e.g. methyl, ethyl, n-propyl, isopropyl, n-butyl, isobutyl, tert-butyl, n-pentyl, n-hexyl, n-heptyl, n-octyl, n-nonyl, n-decyl or n-dodecyl, 5- to 7-membered cycloalkyl which may in turn bear a $C_1$-$C_{10}$-alkyl group and/or $C_6$-$C_{10}$-aryl group as substituent, e.g. cyclopropyl, cyclobutyl, cyclopentyl, cyclohexyl, cycloheptyl, cyclooctyl, cyclononyl or cyclododecyl, $C_2$-$C_{22}$-alkenyl which may be linear, cyclic or branched and in which the double bond may be internal or terminal, e.g. vinyl, 1-allyl, 2-allyl, 3-allyl, butenyl, pentenyl, hexenyl, cyclopentenyl, cyclohexenyl, cyclooctenyl or cyclooctadienyl, $C_6$-$C_{22}$-aryl which may be substituted by further alkyl groups, e.g. phenyl, naphthyl, biphenyl, anthranyl, o-, m-, p-methylphenyl, 2,3-, 2,4-, 2,5- or 2,6-dimethylphenyl, 2,3,4-, 2,3,5-, 2,3,6-, 2,4,5-, 2,4,6- or 3,4,5-trimethylphenyl, or arylalkyl which may be substituted by further alkyl groups, e.g. benzyl, o-, m-, p-methylbenzyl, 1- or 2-ethylphenyl, where the organic radicals $R^{4C}$-$R^{5C}$ may also be substituted by halogens such as fluorine, chlorine or bromine. Furthermore, $R^{4C}$-$R^{5C}$ can be amino groups $N(R^{18C})_2$ or $N(SiR^{19C}_3)_2$, for example dimethylamino, N-pyrrolidinyl or picolinyl. Possible radicals $R^{19C}$ in organosilyl substituents $SiR^{19C}_3$ are the same carboorganic radicals as described above for $R^{1C}$-$R^{3C}$, where two radicals $R^{19C}$ may also be joined to form a 5- or 6-membered ring, e.g. trimethylsilyl, triethylsilyl, butyldimethylsilyl, tributylsilyl, tritert-butylsilyl, triallylsilyl, triphenylsilyl or dimethylphenylsilyl.

Preferred radicals $R^{4C}$-$R^{5C}$ are hydrogen, methyl, ethyl, n-propyl, isopropyl, n-butyl, isobutyl, tert-butyl, n-pentyl, n-hexyl, n-heptyl, n-octyl or benzyl, in particular methyl.

The substituents $R^{8C}$-$R^{17C}$ can be varied within a wide range. Possible carboorganic substituents $R^{8C}$-$R^{17C}$ are, for example, the following: $C_1$-$C_{22}$-alkyl which may be linear or branched, e.g. methyl, ethyl, n-propyl, isopropyl, n-butyl, isobutyl, tert-butyl, n-pentyl, n-hexyl, n-heptyl, n-octyl, n-nonyl, n-decyl or n-dodecyl, 5- to 7-membered cycloalkyl which may in turn bear a $C_1$-$C_{10}$-alkyl group and/or $C_6$-$C_{10}$-aryl group as substituent, e.g. cyclopropyl, cyclobutyl, cyclopentyl, cyclohexyl, cycloheptyl, cyclooctyl, cyclononyl or cyclododecyl, $C_2$-$C_{22}$-alkenyl which may be linear, cyclic or branched and in which the double may be internal or terminal, e.g. vinyl, 1-allyl, 2-allyl, 3-allyl, butenyl, pentenyl, hexenyl, cyclopentenyl, cyclohexenyl, cyclooctenyl or cyclooctadienyl, $C_6$-$C_{22}$-aryl which may be substituted by further alkyl groups, e.g. phenyl, naphthyl, biphenyl, anthranyl, o-, m-, p-methylphenyl, 2,3-, 2,4-, 2,5- or 2,6-dimethylphenyl, 2,3, 4-, 2,3,5-, 2,3,6-, 2,4,5-, 2,4,6- or 3,4,5-trimethylphenyl, or arylalkyl which may be substituted by further alkyl groups, e.g. benzyl, o-, m-, p-methylbenzyl, 1- or 2-ethylphenyl, where two radicals $R^{8C}$ to $R^{17C}$ may also be joined to form a 5-, 6- or 7-membered ring and/or two of the vicinal radicals $R^{8C}$-$R^{17C}$ may be joined to form a five-, six- or seven-membered heterocycle containing at least one atom from the group consisting of N, P, O and S and/or the organic radicals $R^{8C}$-$R^{17C}$ may also be substituted by halogens such as fluorine, chlorine or bromine. Furthermore, $R^{8C}$-$R^{17C}$ can be halogen such as fluorine, chlorine, bromine, amino $NR^{18C}_2$ or $N(SiR^{19C}_3)_2$, alkoxy or aryloxy $OR^{18C}$, for example dimethylamino, N-pyrrolidinyl, picolinyl, methoxy, ethoxy or isopropoxy. Possible radicals $R^{19C}$ in organosilicon substituents $SiR^{19C}_3$ are the same carboorganic radicals which have been mentioned above for $R^{1C}$-$R^{3C}$, where two radicals $R^{19C}$ may also be joined to form a 5- or 6-membered ring, e.g. trimethylsilyl, triethylsilyl, butyldimethylsilyl, tributylsilyl, tritert-butylsilyl, triallylsilyl, triphenylsilyl or dimethylphenylsilyl. These $SiR^{19C}_3$ radicals can also be bound via an oxygen or nitrogen, for example trimethylsilyloxy, triethylsilyloxy, butyldimethylsilyloxy, tributylsilyloxy or tritertbutylsilyloxy.

Preferred radicals $R^{12C}$-$R^{17C}$ are hydrogen, methyl, trifluoromethyl, ethyl, n-propyl, isopropyl, n-butyl, isobutyl, tert-butyl, n-pentyl, n-hexyl, n-heptyl, n-octyl, vinyl, allyl, benzyl, phenyl, fluorine, chlorine and bromine, in particular hydrogen. In particular, $R^{13C}$ and $R^{16C}$ are each methyl, trifluoromethyl, ethyl, n-propyl, isopropyl, n-butyl, isobutyl, tert-butyl, n-pentyl, n-hexyl, n-heptyl, n-octyl, vinyl, allyl, benzyl, phenyl, fluorine, chlorine or bromine and $R^{12C}$, $R^{14C}$, $R^{15C}$ and $R^{17C}$ are each hydrogen.

Preferred radicals $R^{8C}$-$R^{11C}$ are methyl, trifluoromethyl, ethyl, n-propyl, isopropyl, n-butyl, isobutyl, tert-butyl, n-pentyl, n-hexyl, n-heptyl, n-octyl, vinyl, allyl, benzyl, phenyl, fluorine, chlorine and bromine. In particular at least the ortho-substituents $R^{8C}$ and $R^{10C}$ are each, independently, a $C_1$-$C_{22}$-alkyl which may also be substituted by halogens, in particular a tertiary $C_1$-$C_{22}$-n-alkyl which may optionally be further substituted by halogens, e.g. methyl, trifluoromethyl, ethyl, n-propyl, n-butyl, n-pentyl, n-hexyl, n-heptyl, n-octyl, vinyl, or they are each, independently, a halogen such as fluorine, chlorine or bromine. In one more preferred embodiment, in addition to said preferred embodiment of $R^{8C}$ and $R^{10C}$, $R^{9C}$ and $R^{11C}$ are, independently, each a halogen such as fluorine, chlorine or bromine. Particular preference is given to $R^{8C}$-$R^{11C}$ each being a halogen such as fluorine, chlorine or bromine, most preferably fluorine or chlorine.

In particular, $R^{12C}$, $R^{14C}$, $R^{15C}$ and $R^{17C}$ are identical, $R^{13C}$ and $R^{16C}$ are identical, $R^{9C}$ and $R^{11C}$ are identical and $R^{8C}$ and $R^{10C}$ are identical. This is also preferred in the preferred embodiments described above.

The preparation of the compounds B) is described, for example, in J. Am. Chem. Soc. 120, p. 4049 ff. (1998), J. Chem. Soc., Chem. Commun. 1998, 849, and WO 98/27124. Preferred complexes B) are 2,6-Bis[1-(2,6-dimethylphenylimino)ethyl]pyridine iron(II) dichloride, 2,6-Bis[1-(2,4,6-trimethylphenylimino)ethyl]pyridine iron(II) dichloride, 2,6-Bis[1-(2-chloro-6-methylphenylimino)ethyl]pyridine iron(II) dichloride, 2,6-Bis[1-(2,6-diisopropylphenylimino)ethyl]pyridine iron(II) dichloride, 2,6-Bis[1-(2,6-dichlorophenylimino)ethyl]pyridine iron(II) dichloride, 2,6-Bis[1-(2,6-diisopropyl phenylimino)methyl]pyridine iron(II) dichloride, 2,6-Bis[1-(2,4-dichloro-6-methylphenylimino) ethyl]pyridine iron(II) dichloride, 2,6-Bis[1-(2,6-difluorophenylimino)ethyl]pyridine iron(II) dichloride, 2,6-Bis[1-(2,6-difbromophenylimino)ethyl]pyridine iron(II) dichloride or the respective dibromides or tribromides.

In the following, reference to a transition metal complex (A) or catalyst (A) means a monocyclopentadienyl complex (A1) and/or a hafnocene (A2). The molar ratio of transition metal complex A) to polymerization catalyst B) is usually in the range from 1:100 to 100:1, preferably from 1:10 to 10:1 and particularly preferably from 1:5 to 5:1. When a transition metal complex A) is used as sole catalyst under the same reaction conditions in the homopolymerization or copolymerization of ethylene, it preferably produces a higher Mw than does the complex (B) when it is used as sole complex under the same reaction conditions. The preferred embodiments of the complexes (A1), (A2) and (B) are likewise preferred in combinations of complex (A1) and (B) and in the combination of complex (A2) and (B).

The catalyst composition of the invention can be used alone or together with further components as catalyst system for olefin polymerization. Furthermore, we have found catalyst systems for olefin polymerization comprising A) at least one polymerization catalyst based on a monocyclopentadienyl complex of a metal of groups 4-6 of the Periodic Table of the Elements whose cyclopentadienyl system is substituted by an uncharged donor (A1) or is a hafnocene (A2), B) at least one polymerization catalyst based on an iron component having a tridentate ligand bearing at least two ortho, ortho-disubstituted aryl radicals, C) optionally one or more activating compounds, D) optionally one or more organic or inorganic supports, In the following, reference to a transition metal complex (A) or catalyst (A) means a monocyclopentadienyl complex (A1) and/or a hafnocene (A2). Preferably, a hafnocene A2) is used instead of the monocyclopentadienyl complex, esp. chromium complex, A1). The molar ratio of transition metal complex A) to polymerization catalyst B) is usually in the range from 1:100 to 100:1, preferably from 1:10 to 10:1 and particularly preferably from 1:5 to 5:1. When a transition metal complex A) is used as sole catalyst under the same reaction conditions in the homopolymerization or copolymerization of ethylene, it preferably produces a higher Mw than does the complex (B) when it is used as sole complex under the same reaction conditions. The preferred embodiments of the complexes (A1), (A2) and (B) are likewise preferred in combinations of complex (A1) and (B) and in the combination of complex (A2) and (B).

The monocyclopentadienyl complexes (A1), the hafnocene (A2) and/or the iron complex (B) sometimes have only a low polymerization activity and are then brought into contact with one or more activators, viz. the component (C), in order to be able to display a good polymerization activity. The catalyst system therefore optionally further comprises, as component (C), one or more activating compounds, preferably one or two activating compounds (C). It is often advantageous to use the same activator (C) for both the catalysts (A) and (B).

The activators (C) can in each case be used in any amounts based on the complexes (A) and (B) of the catalyst composition of the invention. They are preferably used in an excess or in stoichiometric amounts, in each case based on the complex (A) or (B) which they activate. The amount of activating compound(s) to be used depends on the type of the activator (C). In general, the molar ratio of transition metal complex (A) or iron complex (B) to activating compound (C) is also usually in the range of from 1:0.1 to 1:10000, preferably from 1:1 to 1:2000. Suitable compounds (C) which are able to react with the transition metal complex (A) or the iron complex (B) to convert it into a catalytically active or more active compound are, for example, compounds such as an aluminoxane, a strong uncharged Lewis acid, an ionic compound having a Lewis-acid cation or an ionic compound containing a Brönsted acid as cation. Suitable and preferred activator substances, their structure as well as their mode of use and their mode of preparation, have been set forth for the same catalyst system as that of the present invention in WO 05/103096 and are incorporated herewith by reference.

As joint activator (C) for the catalyst component (A) and (B), preference is given to using an aluminoxane, in particular methylaluminoxane. Preference is also given to the combination of salt-like compounds comprising a Lewis-acid cation as described in WO 05/103096 in full detail, incorporated herewith by reference, in particular N,N-dimethylanilinium tetrakis(pentafluorophenyl)borate, N,N-dimethylcyclohexylammonium tetrakis(pentafluorophenyl)borate, N,N-dimethylbenzylammonium tetrakis(pentafluorophenyl)borate or trityl tetrakispentafluorophenylborate, as activator (C) for hafnocenes (A2), in particular in combination with an aluminoxane as activator (C) for the iron complex (B). Further suitable activating compounds (C) are listed in WO 00/31090.

Particular preference is given to a catalyst system comprising at least one transition metal complex (A), at least one iron complex (B), at least one activating compound (C) and at least one support component (D). As support component (D), preference is given to using finely divided supports which can be any organic or inorganic solid. Examples are silica gel, magnesium chloride, aluminum oxide, mesoporous materials, aluminosilicates, hydrotalcites and organic polymers such as polyethylene, polypropylene, polystyrene, polytetrafluoroethylene or polymers bearing polar functional groups, for example copolymers of ethene and acrylic esters, acrolein or vinyl acetate. The support materials used preferably have a specific surface area in the range from 10 to 1000 m$^2$/g, a pore volume in the range from 0.1 to 5 ml/g and a mean particle size of from 1 to 500 μm. Preferably, the transition metal complex (A) and, likewise, the iron complex (B) are applied in such an amount that the concentration of the transition metal from (A) and, respectively, the iron from the iron complex (B) in the finished catalyst system is from 1 to 200 µmol per g of support (D). In a preferred embodiment, both the components (A) and (B) are supported. The components (A) and (B) are preferably applied to a joint support in order to ensure a relatively close spatial proximity of the various catalyst centers and thus to ensure good mixing of the different polymers formed. Suitable and preferred support materials, their mode of preparation and their appliance or mixing with catalyst, as well as general and preferred modes of carrying out the polymerization process with catalyst system of the present invention, is amply described in WO 05/103096 whose disclosure is incorporated herewith by reference.

The catalyst composition or catalyst system of the present invention is suitable for preparing the polyethylene of the invention, which has advantages in use and excellent processing properties. General and preferred methods of polymerization using said catalyst system have been set forth WO 05/103096, incorporated herewith by reference.

To prepare the polyethylene of the invention, the ethylene is polymerized as described above with α-olefins having from 3 to 12 carbon atoms.

In the copolymerization process of the invention, ethylene is polymerized with α-olefins having from 3 to 12 carbon atoms. Preferred α-olefins are linear or branched $C_2$-$C_{12}$-1-alkenes, in particular linear $C_2$-$C_{10}$-1-alkenes such as ethene, propene, 1-butene, 1-pentene, 1-hexene, 1-heptene, 1-octene, 1-decene or branched $C_2$-$C_{10}$-1-alkenes such as 4-methyl-1-pentene. Particularly preferred α-olefins are $C_4$-$C_{12}$-1-alkenes, in particular linear $C_6$-$C_{10}$-1-alkenes. It is also possible to polymerize mixtures of various α-olefins. Preference is given to polymerizing at least one α-olefin selected from the group consisting of ethene, propene, 1-butene, 1-pentene, 1-hexene, 1-heptene, 1-octene and 1-decene. Monomer mixtures containing at least 50 mol % of ethene are preferably used.

The polymerization is preferably carried out in a single reactor, in particular in a gas-phase reactor. The polymerization of ethylene with α-olefins having from 3 to 12 carbon atoms gives the polyethylene of the invention where the catalyst of the invention is used. The polyethylene powder obtained directly from the reactor displays a very high homogeneity, so that, unlike the case of cascade processes, subsequent extrusion is not necessary in order to obtain a homogeneous product.

The production of polymer blends by intimate mixing of individual components, for example by melt extrusion in an extruder or kneader (cf., for example, "Polymer Blends" in Ullmann's Encyclopedia of Industrial Chemistry, 6$^{th}$ Edition, 1998, Electronic Release), is often accompanied by particular difficulties. The melt viscosities of the high and low molecular weight components of a bimodal polyethylene blend are extremely different. While the low molecular weight component is quite fluid at the customary temperatures of about 190-210° C. used for producing the blends, the high molecular weight component is only softened ("lentil soup"). Homogeneous mixing of the two components is therefore for very difficult. In addition, it is known that the high molecular weight component can easily be damaged as a result of thermal stress and by shear forces in the extruder, so that the properties of the blend are adversely affected. The mixing quality of such polyethylene blends is therefore often unsatisfactory.

The mixing quality of the polyethylene powder obtained directly from the reactor can be tested by assessing thin slices ("microtome sections") of a sample under an optical microscope. Inhomogenities show up in the form of specks or "white spots". The specs or "white spots" are predominantly high molecular weight, high-viscosity particles in a low-viscosity matrix (cf., for example, U. Burkhardt et al. in "Aufbereiten von Polymeren mit neuartigen Eigenschaften", VDI-Verlag, Düsseldorf 1995, p. 71). Such inclusions can reach a size of up to 300 cause stress cracks and result in brittle failure of components. The better the mixing quality of a polymer, the fewer and smaller are these inclusions observed. The mixing quality of a polymer is determined quantitatively in accordance with ISO 13949. According to the measurement method, a microtome section is prepared from a sample of the polymer, the number and size of these inclusions are counted and a grade is determined for the mixing quality of the polymer according to a set assessment scheme. The mixing quality in the polyethylene directly obtained from the reactor, the polymer powder without extrusion is preferably less than 3.

The preparation of the polyethylene of the invention in the reactor reduces the energy consumption, requires no subsequent blending processes and makes simple control of the molecular weight distributions and the molecular weight fractions of the various polymers possible. In addition, good mixing of the polyethylene is achieved.

The following examples illustrate the invention without restricting the scope of the invention.

The values described were determined in the following way:

The determination of the molar mass distributions and the means Mn, Mw and Mw/Mn derived therefrom was carried out by high-temperature gel permeation chromatography using a method described in DIN 55672-1:1995-02 issue February 1995. The deviations according to the mentioned DIN standard are as follows: Solvent 1,2,4-trichlorobenzene (TCB), temperature of apparatus and solutions 135° C. and as concentration detector a PolymerChar (Valencia, Paterna 46980, Spain) IR-4 infrared detector, suitable for use with TCB.

A WATERS Alliance 2000 equipped with the following precolumn SHODEX UT-G and separation columns SHODEX UT 806 M (3x) and SHODEX UT 807 connected in series was used. The solvent was vacuum destilled under nitrogen and was stabilized with 0.025% by weight of 2,6-di-tert-butyl-4-methylphenol. The flowrate used was 1 ml/min, the injection was 500 µl and polymer concentration was in the range of 0.01%<conc.<0.05% w/w. The molecular weight calibration was established by using monodisperse polystyrene (PS) standards from Polymer Laboratories (now Varian, Inc., Essex Road, Church Stretton, Shropshire, SY6 6AX, UK) in the range from 580 g/mol up to 11600000 g/mol and additionally Hexadecane. The calibration curve was then adapted to Polyethylene (PE) by means of the Universal Calibration method (Benoit H., Rempp P. and Grubisic Z., & in J. Polymer Sci., Phys. Ed., 5, 753 (1967)). The Mark-Houwing parameters used herefore were for PS: $k_{PS}$=0.000121 dl/g, $α_{PS}$=0.706 and for PE $k_{PE}$=0.000406 dl/g, $α_{PE}$=0.725, valid in TCB at 135° C. Data recording, calibration and calculation was carried out using NTGPC_Control_V6.02.03 and NTG-PC_V6.4.24 (hs GmbH, Hauptstraβe 36, D-55437 Ober-Hilbersheim) respectively.

The haze, as determined according to ASTM D 1003-00 on a BYK Gardener Haze Guard Plus Device on at least 5 pieces of film 10×10 cm with a thickness of 1 mm.

The stress crack resistance ('full notch creep test', FNCT)) was determined in [h] according to ISO16770:2004 E at a pressure of 6 Mbar at 50° C. in a 2% by weight solution of Akropal N (n=10), that is Akropal N100 brand owned by Clariant AG, Muttenz/Switzerland, corresponding to CAS 9016-45-9, (4-nonlyphenyl)polyethylenglycolether, with n=10 for the number of repeat units in the PEG chain) in water, including test specimen preparation as a compressed plate as described in ISO 16770:2004 E.—The time to failure is shortened by initiating a crack by means of the notch in 2% Arkopal solution as a stress crack promoting medium.

The spiral flow test assesses the length of a spiral flow of polymer to be tested and injected into a spiral mould; in injection moulding, it is a measure of the processing behaviour. Spiral flow testing was carried out in
condition A: on KraussMaffei KM 150-700C2 with a stock temperature of 250° C., an injection pressure of 1000 bar, a screw speed of 90 mm/s, a mould temperature of 30° C., a wall thickness of the spiral mould of 2 mm and a closing pressure of 150 t.
and in condition B with a stock temperature of 190° C., an injection pressure of 1050 bar, and a wall thickness of the spiral of 1 mm essentially as described in WO 07/003,530, employing the same technical equipment and settings used in there.

Abbreviations in the table below:
$M_w$ Weight average molar mass
$M_n$ Number average molar mass
MI melt index or melt flow rate, measured at the indexed load [kg]

EXAMPLE 1

Preparation of the Catalyst System

The preparation of the catalyst components of the mixed catalyst system, and the preparation of the mixed catalyst system from said individual catalyst components on a common support material, was carried out essentially as described in the experimental section of WO 05/103096, see example 1 and the preceding section headed 'preparation of individual catalyst components' in there. The mixed catalyst system was made up from Bis(n-butylcyclopentadienyl)hafnium dichloride and 2,6-Bis[1-(2,4-dichloro-6-methylphenylimino)ethyl]pyridine iron(II) dichloride supported in admixture on a XPO-2107, a spray-dried silica gel from Grace Chemicals, as described in WO 05/103096 already.

Polymerization

The polymerization using the catalyst of example 1, was carried out in a fluidized-bed reactor essentially as described in WO 05/103096 in example 1 thereof. Feed rate of molar mass regulators, in particular hydrogen, was adjusted as to broaden the molecular weight distribution Mw/Mn to >10. In the mixed catalyst system of the present invention, lowering of hydrogen feed rate will dominantly shift the metallocene product fraction to higher molecular weight. The iron catalyst does not respond to hydrogen in this way and essentially retains its peak molecular weight. This way, the polydispersity of the multimodal product can be adjusted. The properties of the polymers obtained are summarized in Table 1, opposed to that of those of the comparative examples.

Comparative Example 1

A trimodal polyethylene was prepared by non-metallocene catalysis in a reactor cascade according to the example given in WO 07/003,530 from the same applicant as the present invention.

Comparative Example 2

For comparing the product of the present invention on equal terms, the FNCT value of the biomodal, metallocene derived polyethylene described in the example of WO 05/103096 from same applicant was determined to correspond to 16 h at the presently employed testing condition of 3.5 MPa, 80° C. As described earlier, the spiral length tested under the different conditions set forth in WO05/103096 of 250° C., 2 mm spiral width, was 47.6 mm.

Comparative Example 3

A commercial product, ELTEX® B4020N1331 commercially available from INEOS Polyolefins S.A., Belgium, was tested.

Characterisation of Products

The material characteristics of the polymer of exp. 1 of the present invention and the corresponding ones of the comparative exp. 1 are given in Table 1.

For FNCT testing, the polymers were each formed into small compressed plates or sheets of 1 mm thickness on an Engel injection molding machine, essentially as described for testing specimen preparation in ISO 16770:2004 E.

TABLE I

| Ex. | MI (2.16 g/190° C.) [g/10 min] | MI (5 kg/190° C.) [g/10 min] | Mn [g/mol] | Mw [g/mol] | $M_w/M_n$ | density [g/cm³] | FNCT [h] | Spiral length (1050 bar, 1 mm width, 190° C.) [mm] | Spiral length (1000 bar, 2 mm width, 250° C.) [mm] |
|---|---|---|---|---|---|---|---|---|---|
| 1 | 2.7 | 9.5 | 8700 | 112000 | 12.9 | 0.952 | 69.4 | 223 | 692 |
| C1 | 1.5 | 6.5 | 8500 | 166000 | 19.5 | 0.954 | 24.3 | 170 | 438 |
| C2 | — | — | — | 99000 | 7.9 | 0.953 | 16 | — | 476 |
| C3 | 2 | 7.3 | 16800 | 128000 | 7.6 | 0.954 | 7.2 | 115 | — |

The invention claimed is:

1. A polyethylene composition which comprises ethylene homopolymers and/or copolymers of ethylene with $C_3$-$C_{20}$-1-alkenes having a molecular weight distribution Mw/Mn from 10 to 20, a density of from 0.92 to 0.98 g/cm³, a melt flow rate MI from 0.5 to 10 g/10 min, a high load melt index from 50 to 300 g/10 min, and a spiral length from 200 to 250 mm, at a spiral flow testing condition of 1050 bar, 1 mm spiral wall thickness and 190° C.

wherein the polyethylene composition does not show a TREF peak with a maximum above 90° C.

2. The polyethylene composition according to claim 1, having an at least bimodal short chain branching distribution and/or a density of from 0.945 to 0.965 g/cm³ and/or a MI (2.16 kg/190° C.) of from 1 to 10 g/10 min and/or a weight average molar mass Mw of from 50,000 g/mol to 200,000 g/mol.

3. The polyethylene composition according to claim 1, having from 0.1 to 15 branches/1000 carbon atoms, wherein the 1 to 15% by weight of the polyethylene having the highest molar masses have a degree of branching more than 1 branch of side chains larger than $CH_3$/1000 carbon atoms.

4. The polyethylene composition according to claim 1, wherein the polyethylene composition has been prepared in a single reactor with a catalyst system comprising two different transition metal catalysts.

5. The polyethylene composition according to claim 1, having a stress cracking resistance of at least 30 h.

6. An injection moulding comprising a polyethylene composition according to claim 1.

7. The injection moulding according to claim 6, having a haze of less than 94%.

8. The injection moulding according to claim 6 having a stress cracking resistance of at least 30 h.

9. The injection moulding according to claim 6, wherein the injection moulding is a cap, closure, screw cap, screw closure, tube shoulder or engineering part.

10. The injection moulding of claim 9 wherein the injection moulding is a screw cap.

* * * * *